United States Patent
Kataoka et al.

(10) Patent No.: US 10,747,725 B2
(45) Date of Patent: Aug. 18, 2020

(54) COMPRESSING METHOD, COMPRESSING APPARATUS, AND COMPUTER-READABLE RECORDING MEDIUM

(71) Applicant: FUJITSU LIMITED, Kawasaki-shi, Kanagawa (JP)

(72) Inventors: Masahiro Kataoka, Kamakura (JP); Takahiro Murata, Yokohama (JP); Takafumi Ohta, Shinagawa (JP); Masanori Sakai, Mishima (JP); Masao Ideuchi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 15/865,394

(22) Filed: Jan. 9, 2018

(65) Prior Publication Data

US 2018/0129678 A1     May 10, 2018

Related U.S. Application Data

(63) Continuation of application No. PCT/JP2015/070190, filed on Jul. 14, 2015.

(51) Int. Cl.
*G06F 7/00* (2006.01)
*G06F 16/174* (2019.01)
(Continued)

(52) U.S. Cl.
CPC ........ *G06F 16/1744* (2019.01); *G06F 16/134* (2019.01); *G06F 16/183* (2019.01); *G06F 16/316* (2019.01)

(58) Field of Classification Search
CPC .. G06F 16/183; G06F 16/134; G06F 16/1744; G06F 16/316
See application file for complete search history.

(56) References Cited

U.S. PATENT DOCUMENTS

| 5,774,588 A | 6/1998 | Li |
| 6,434,686 B1 | 8/2002 | Matsui et al. |

(Continued)

FOREIGN PATENT DOCUMENTS

| JP | 11-505052 | 5/1999 |
| JP | 11-219316 | 8/1999 |

(Continued)

OTHER PUBLICATIONS

International Search Report dated Oct. 20, 2015 in PCT/JP2015/070190, filed on Jul. 14, 2015 (with English Translation).

(Continued)

*Primary Examiner* — Kannan Shanmugasundaram
(74) *Attorney, Agent, or Firm* — Xsensus LLP

(57) ABSTRACT

A non-transitory computer-readable recording medium stores a compressing program that causes a computer to execute a process including: extracting words from a file serving as a processing target; counting how many times each of the extracted words appears; registering bit strings each expressing, in multiple bits, the number of times of appearance into an index so as to be kept in correspondence with the words and the file; among the plurality of bit strings registered in the index while being kept in correspondence with the words and the file, each rearranging, within the bit string, bits included in a first bit string and bits included in a second bit string, so as to be in a different order; and compressing the index in which the bits have been rearranged, by using mutually-different mathematical functions.

5 Claims, 12 Drawing Sheets

(51) Int. Cl.
  *G06F 16/13* (2019.01)
  *G06F 16/31* (2019.01)
  *G06F 16/182* (2019.01)
  *G06F 17/00* (2019.01)

(56) References Cited

U.S. PATENT DOCUMENTS

| | | | |
|---|---|---|---|
| 6,804,767 B1 * | 10/2004 | Melvin | H04L 45/745 |
| | | | 711/216 |
| 2004/0075598 A1 * | 4/2004 | Pau | H03M 7/30 |
| | | | 341/107 |
| 2008/0040307 A1 | 2/2008 | Loofbourrow | |
| 2008/0133565 A1 * | 6/2008 | Yasuda | G06F 16/319 |
| 2010/0281032 A1 | 11/2010 | Loofbourrow | |
| 2012/0084305 A1 | 4/2012 | Inoue et al. | |
| 2012/0254190 A1 | 10/2012 | Kataoka et al. | |
| 2013/0163860 A1 | 6/2013 | Suzuki et al. | |

FOREIGN PATENT DOCUMENTS

| | | |
|---|---|---|
| JP | 11-306203 | 11/1999 |
| JP | 2012-38239 | 2/2012 |
| JP | 2012-216088 | 11/2012 |
| WO | WO 96/41280 | 12/1996 |
| WO | WO 2010/143573 A1 | 12/2010 |
| WO | WO 2013/175537 A1 | 11/2013 |

OTHER PUBLICATIONS

Written Opinion dated Oct. 20, 2015 in PCT/JP2015/070190, filed on Jul. 14, 2015.

* cited by examiner

FIG.6

| SYNONYM NUMBERS | SIMILAR WORDS |
|---|---|
| F00011h | mouse, rat, cavy, ⋯ |
| ⋮ | ⋮ |

FIG.8

| BASIC CODES | COMPRESSION CODES |
|---|---|
| ⋮ | ⋮ |
| A0002Ch | A003h |
| ⋮ | ⋮ |

33

| INDEX | | | | | | | |
|---|---|---|---|---|---|---|---|
| | | FILE NUMBERS | | | | 34a | α |
| BASIC CODES | | 1 | 2 | 3 | ... n | | |
| A00001h | (a) | 0100 | 0011 | 0001... | | | |
| A00312h | (is) | 0011 | 0000 | 0101... | | | |
| A00200h | (first) | 0000 | 0011 | 0001... | | | |
| A00A00h | (this) | 0011 | 0001 | 0100 | | | |

BASIC CODES :

A001B3h (cavy) 0000 0000 0011... — 34b

SYNONYM NUMBERS :

F00011h 0011 0001 0010... — 34c

1: ···This is a ball···
2: ···
n: ···first cavy···

```
INDEX
                   FILE NUMBERS
    BASIC          1      2      3     ...    n        α
    CODES
      ⋮            ⋮      ⋮      ⋮
    A001B3h  (cavy)   0001   0000   0000  ...
    A001B4h  (mouse)  0001   0000   0000  ...
    A001B5h  (rat)    0001   0000   0000  ...
      ⋮
```

COMPRESSING METHOD, COMPRESSING APPARATUS, AND COMPUTER-READABLE RECORDING MEDIUM

CROSS-REFERENCE TO RELATED APPLICATION

This application is a continuation application of International Application No. PCT/JP2015/070190, filed on Jul. 14, 2015 and designating the U.S., the entire contents of which are incorporated herein by reference.

FIELD

The embodiments discussed herein are related to a compressing method, a compressing apparatus, and a computer-readable recording medium.

BACKGROUND

A technique is known by which a file having a high degree of relevance to a search target character string is searched for from a plurality of files. According to this technique, the file including a word in the search target character string is identified by using an index. Further, the number of times the word appears (hereinafter, "the number of times of appearance") in the search target character string is calculated by conducting a search in the identified file, and further, the file having a high degree of relevance is identified based on frequency of appearance. The index denotes data indicating one or more files containing each of the words. For example, in the index, one bit is kept in correspondence with each set made up of a word and a file so as to store therein, by using a value in the bit, whether or not the file corresponding to the bit includes the word.

In such an index, when one bit is kept in correspondence with a file for each of the words, the data size is prone to be large when a large number of files are involved. For this reason, a technique is known by which the data size of the index is compressed to a smaller level, by bringing multiple bits into correspondence with one bit with the use of mutually-different mathematical functions.

For example, a bit array A in an index kept in correspondence with files for each of the words is converted into a bit array X and a bit array Y, by bringing multiple bits into correspondence with one bit while using mutually-different two hash functions. The bit array X and the bit array Y have been converted by using the mutually-different hash functions. For this reason, for example, a plurality of files that are kept in correspondence with mutually the same bit in the bit array X are kept in correspondence with mutually-different bits in the bit array Y. Accordingly, in the bit array X and the bit array Y, when the bits corresponding to a certain file indicate that a certain word is included, it is identified that the certain file includes the certain word.

Patent Document 1: International Publication Pamphlet No. WO 2013/175537

In the field of text mining, however, according to a related technique, the number of times of appearance is counted for each of the words and relevant synonyms, which involves calculations of scores based on the counts. According to the related technique, because the number of times of appearance is counted in this manner for each of the words included in the files that were identified, in the index, as including the word, it may take time to perform the processing in some situations.

To cope with this situation, it is also possible to use another method by which the index is structured as a count-map type index storing therein information about the number of times of appearance of each of the words in each of the files. For example, in parallel to a compressing process by which a code is assigned to each of the words in character strings in text files, the number of times of appearance is stored into the index while using multiple bits that are kept in correspondence with a set made up of a word and a file. When multiple bits are kept in correspondence with each set made up of a word and a file in this manner, the data size of the index is prone to be large. To cope with this situation, it is also possible, like in the related technique, to compress the data size of the index to a smaller level by using mutually-different mathematical functions. Similarly to bit-map type indices, because count-map type indices in which the number of times of appearance is stored by using multiple bits are also prone to have bit conflicts in hash functions, a lot of noise may occur when the compressed data is restored, in some situations.

SUMMARY

According to an aspect of the embodiments, a non-transitory computer-readable recording medium stores a compressing program that causes a computer to execute a process including: extracting words from a file serving as a processing target; counting how many times each of the extracted words appears; registering bit strings each expressing, in multiple bits, the number of times of appearance into an index so as to be kept in correspondence with the words and the file; among the plurality of bit strings registered in the index while being kept in correspondence with the words and the file, each rearranging, within the bit string, bits included in a first bit string and bits included in a second bit string, so as to be in a different order; and compressing the index in which the bits have been rearranged, by using mutually-different mathematical functions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a table illustrating an example of a data structure of a synonym database;

FIG. 8 is a table illustrating an example of a data structure of a dynamic dictionary;

DESCRIPTION OF EMBODIMENT

Preferred embodiments will be explained with reference to accompanying drawings. The scope of the patent shall not be limited by these embodiments. It is possible to combine any of the embodiments together as appropriate, as long as no conflict occurs in the contents of the processing.

[a] First Embodiment

An Index Generating Process

Figure 1:
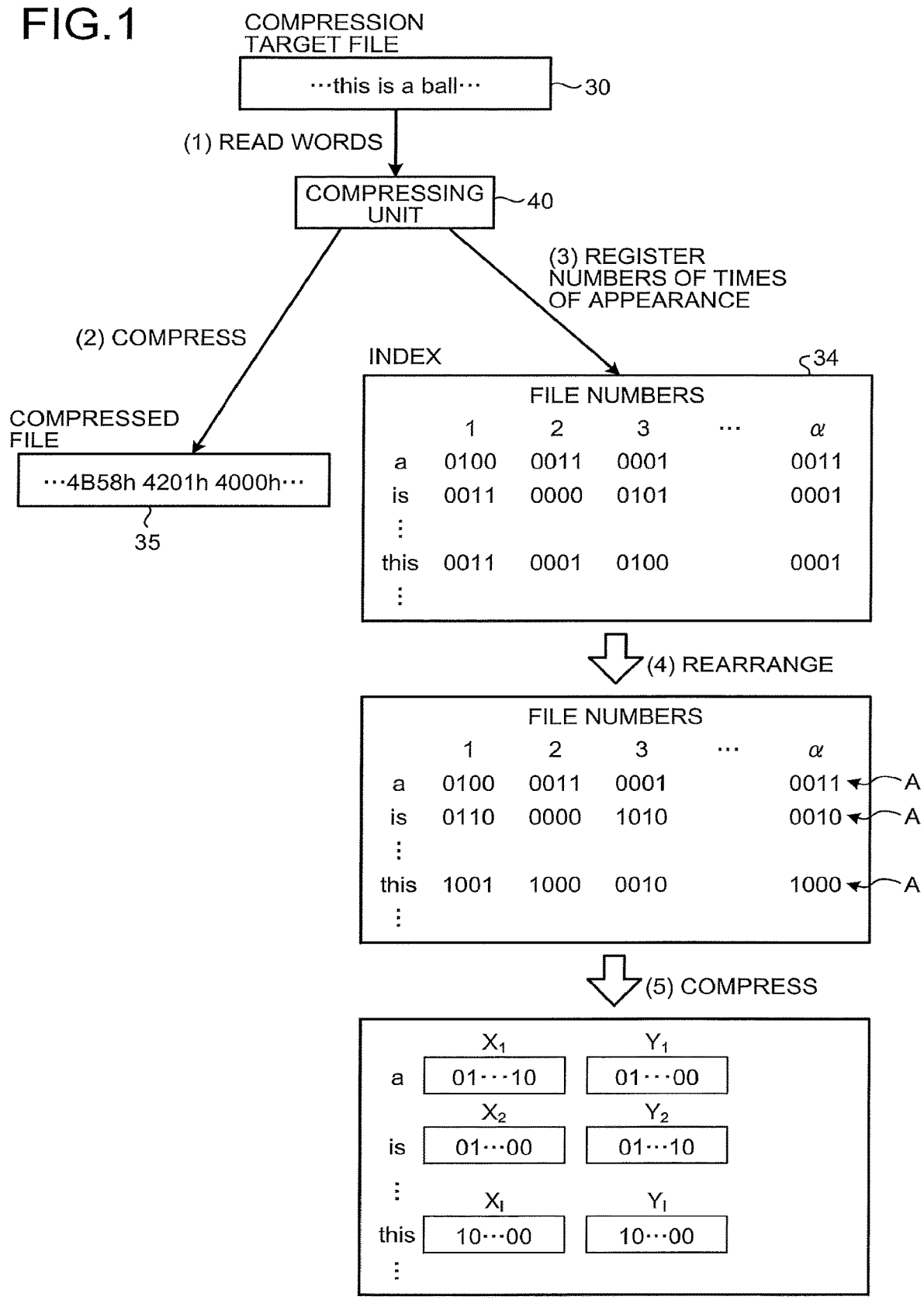
FIG. 1 is a schematic diagram illustrating a flow in a compressing process to compress a file.

First, with reference to FIG. 1, a process performed by a compressing apparatus 10 according to a first embodiment to generate an index will be explained. When compressing a file, the compressing apparatus 10 performs a process of generating an index 34. FIG. 1 is a schematic diagram illustrating a flow in a compressing process to compress the file. FIG. 1 illustrates an example in which the index 34 is generated by compressing a sentence " . . . this is a ball . . . " included in a compression target file 30 to be compressed. A compressing unit 40 included in the compressing apparatus 10 extracts words, in units of words, from the text included in the compression target file 30 (FIG. 1 (1)). In the example in FIG. 1, "this", "is", "a" and "ball" are extracted. Further, the compressing unit 40 compresses the text included in the compression target file 30, by assigning a compression code to each word, in units of words (FIG. 1 (2)). Further, the compressing unit 40 counts how many times each of the words included in the text contained in the compression target file 30 appears (i.e., the number of times of appearance) and further registers the numbers of times of appearance into the index 34 (FIG. 1 (3)).

The index 34 is data storing therein information about the numbers of times of appearance of each of the words in each of the files. For example, the index 34 is provided with bit strings each of which has multiple bits and that are kept in correspondence with the words and the files, so as to store the numbers of times of appearance into the bit strings in correspondence with the words and the files. For example, the compression target file 30 is kept in correspondence with one of sequential file numbers. In the example in FIG. 1, the index 34 has the bit strings each of which has four bits and that are kept in correspondence with the words and the files, so as to store therein the bit strings each expressing the number of times of appearance of an appearing word by using the four bits. Although each of the bit strings recording the number of times of appearance has four bits in the example in FIG. 1, the number of bits in each of the bit strings is not limited to the value in this example. Further, the bit strings may be kept in correspondence with the numbers of times of appearance in a discrete manner. For example, the numbers of times of appearance may be registered into the bit strings so as to be kept in correspondence with the values in the bit strings in the manner of exponents, such as the number of times of appearance "0" corresponds to "0000", the number of times of appearance "1" corresponds to "0001", the number of times of appearance "4" corresponds to "0010", and the number of times of appearance "8" corresponds to "0011". When the index 34 is provided with the bit strings each of which has multiple bits and that are kept in correspondence with the words and the files, the data size thereof is prone to be large. Further, the words appearing in the sentences included in the compression target file 30 are biased, and the numbers of times of appearance thereof are also biased. For example, because many words do not appear, the number of times of appearance is 0 for those words. Further, even for appearing words, the number of times of appearance is not so large for many of the appearing words. For these reasons, the bit strings each having four bits and registering therein the numbers of times of appearance are biased in terms of frequency of "0s" and "1s" among the bits.

To cope with this situation, the compressing unit 40 rearranges the bits included in the bit strings provided in the index 34 in correspondence with the words and the files, within each of the bit strings (FIG. 1 (4)). For example, the compressing unit 40 rearranges the bits by rotating the bits in each of the bit strings, by using a predetermined number of bits that varies among a plurality of words. For example, while sequentially changing the number of rotated bits used for rotating the bits to a different one of the values 0, 1, 2, and 3, the compressing unit 40 rearranges the bits for each of the words, by rotating the bits in each of the bit strings registering therein the number of times of appearance of a corresponding word in a corresponding file, within the bit string by the number of rotated bits. When rotating the bits, within each of the bit strings, the bits are moved toward the most significant bit side, and the most significant bit in the bit string is moved to the least significant bit in the bit string. In the example in FIG. 1, for the word "is", the bits in the bit strings are rotated by one bit. As a result, for the word "is", the bit string "0011" for file number "1" is changed to "0110", whereas the bit string "0101" for file number "3" is changed to "1010", and the bit string "0001" for file number "α" is changed to "0010". Further, in the example in FIG. 1, for the word "this", the bits in the bit strings are rotated by three bits. As a result, for the word "this", the bit string "0011" for file number "1" is changed to "1001", whereas the bit strings "0001" for file numbers "2" and "α" are changed to "1000", and the bit string "0101" for file number "3" is changed to "0010". With these arrangements, the index 34 has been leveled as a result of suppressing the bias between "0s" and "1s" among the bits in the bit strings.

The compressing unit 40 compresses the data size of the index 34 to a smaller level (FIG. 1 (5)), by bringing multiple bits into correspondence with one bit, by using a plurality of mutually-different hash functions. For example, the compressing unit 40 converts each of the bit arrays A in the index 34 into two bit arrays, the bit arrays A each including bit strings corresponding to the files for a corresponding word, by bringing the multiple bits into correspondence with one bit while using mutually-different two hash functions. Details of the compressing process performed on the index 34 will be explained later. In the example in FIG. 1, the bit array A of the word "a" is compressed by being converted into a bit array $X_1$ and a bit array $Y_1$. Further, the bit array A of the word "is" is compressed by being converted into a bit array $X_2$ and a bit array $Y_2$. Further, the bit array A of the word "this" is compressed by being converted into a bit array $X_1$ and a bit array $Y_1$. As a result, the compressing apparatus 10 is able to keep the data size of the index 34 small.

Figure 2:
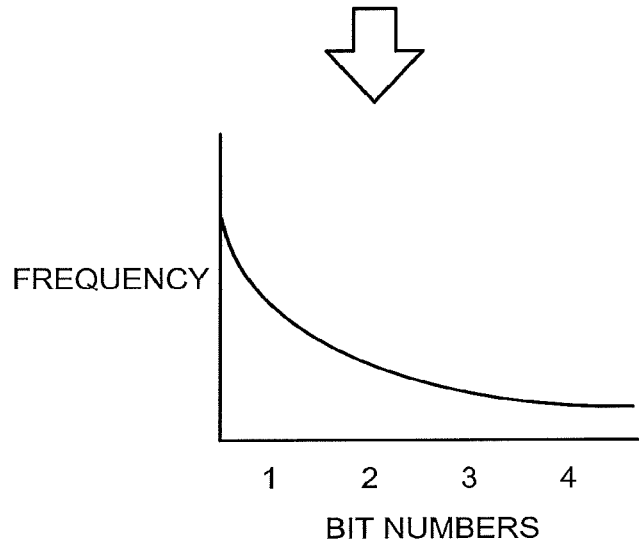
FIG. 2 is a drawing for explaining a bias in frequency of "0s" and "1s" among bits in bit strings.

Next, a bias in frequency of "0s" and "1s" among the bits in the bit strings registering therein the numbers of times of appearance will be explained. FIG. 2 is a drawing for explaining the bias in the frequency of "0s" and "1s" among the bits in the bit strings. FIG. 2 illustrates the index 34. As explained above, the words appearing in the sentences included in the compression target file 30 are biased, and the numbers of times of appearance are also biased. The number of times of appearance of many words is small. For this reason, in the bit strings of the index 34, the less significant the position of a bit is, the higher is the frequency of being "1", and the more significant the position of a bit is, the lower is the frequency of being "1". In the example in FIG. 2, the most significant bits 60 and the least significant bits 61 are indicated. As illustrated in FIG. 2, the least significant bits "61" have higher frequency of being "1". On the contrary, the most significant bits "60" have lower frequency of being "1". FIG. 2 illustrates an example of frequency with which "1" appears in each of the bits in a bit string. As illustrated in FIG. 2, the first bit, which is less significant, has higher frequency of being "1". On the contrary, the fourth bit, which is more significant, has lower frequency of being "1".

In the index 34, when the frequency of "0s" and "1s" is biased among the bits, during the compressing process using the plurality of mutually-different hash functions, bit conflicts easily occur in the hash functions. As a result, a lot of noise may occur when the compressed data is restored, in some situations.

Figure 3:
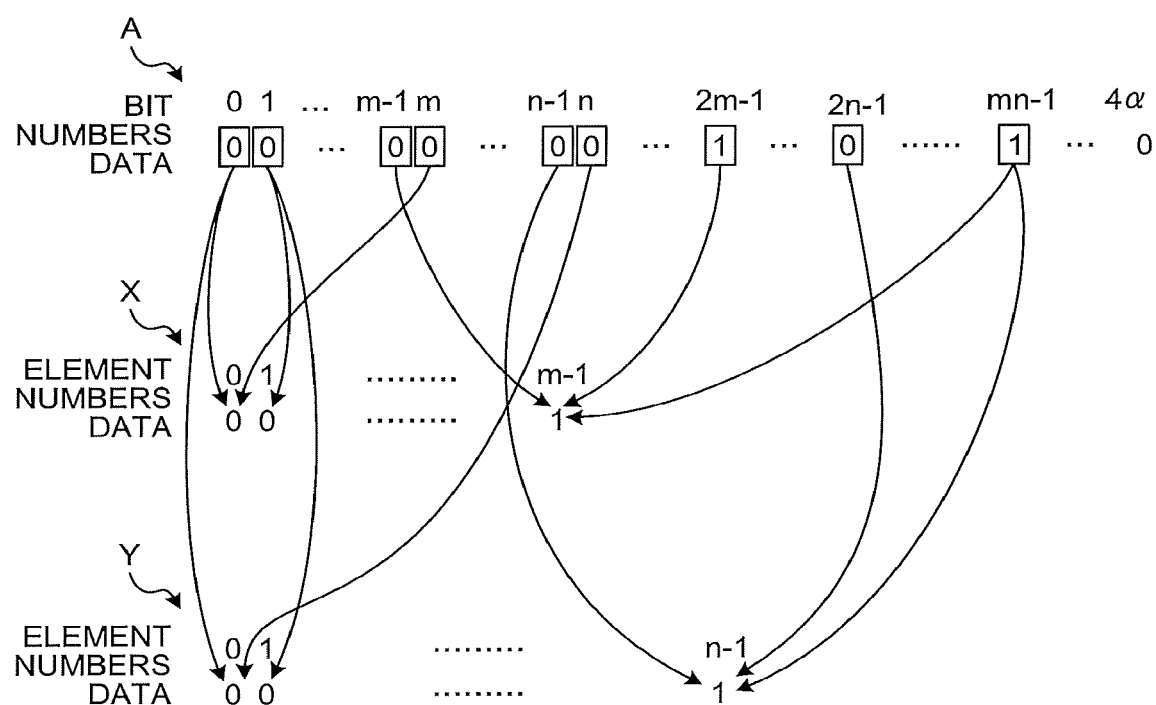
FIG. 3 is a drawing illustrating an example of an index compressing process.

Next, the compressing process on the index 34 will be explained. FIG. 3 is a drawing illustrating an example of the index compressing process. FIG. 3 illustrates an example of a bit array in which bit strings are arranged, the bit strings registering therein the numbers of times of appearance of a word in files. The bit array A records therein the number of times of appearance of the word, by using a bit string having four bits for each of the files up to file number $\alpha$, and the number of bits therein is equal to $4\alpha$. The compressing unit 40 compresses the data size of the index 34 to a smaller level by bringing multiple bits in the bit array A into correspondence with one bit, while using a plurality of mutually-different hash functions. For example, the compressing unit 40 compresses the bit array A into a bit array X having m bits and a bit array Y having n bits, in both of which the number of bits is smaller than $4\alpha$. The bit array X is an array having m bits of which element numbers run from 0 to m−1. The bit array Y is an array having n bits of which element numbers run from 0 to n−1. The numbers n and m are mutually-different prime numbers and, preferably, are adjacent prime numbers. The numbers n and m are such that the product thereof is smaller than $4\alpha$. For example, when $\alpha=2,500$ and $4\alpha=10,000$ are satisfied, n and m are "97" and "101", respectively.

The hash functions are used for bringing the bits in the bit array A into correspondence with the bits in the bit arrays X and Y resulting from the compressing process. For example, the hash functions are each a mathematical function to calculate a remainder of dividing the bit number of each of the bits in the bit array A by the bit number in the post-compression bit array. The compressing unit 40 compresses the bit strings by bringing multiple bits having mutually the same remainder calculated by the hash function, into correspondence with one bit.

For example, in the example in FIG. 3, a first hash function is a mathematical function to calculate a remainder of dividing the bit number of each of the bits in the bit array A by m. The first hash function outputs one of the values ranging from 0 to m−1 for each of the bits in the bit array A. The compressing unit 40 compresses the bit array A by converting the bit array A into the bit array X, by bringing multiple bits having mutually the same remainder calculated by the first hash function into correspondence with one bit. In the example in FIG. 3, such bits in the bit array A that are identified with the bit numbers "0" and "m", each of which has the remainder "0" when being divided by m, are brought into correspondence with the bit identified with the element number "0" in the bit array X. Further, in the example in FIG. 3, such bits in the bit array A that are identified with the bit numbers "m−1", "2m−1", and "mn−1", each of which has the remainder "m−1" when being divided by m, are brought into correspondence with the bit identified with the element number "m−1" in the bit array X.

Further, in the example in FIG. 3, a second hash function is a mathematical function to calculate a remainder of dividing the bit number of each of the bits in the bit array A by n. The second hash function outputs one of the values ranging from 0 to n−1 for each of the bits in the bit array A. The compressing unit 40 compresses the bit array A by converting the bit array A into the bit array Y, by bringing multiple bits having mutually the same remainder calculated by the second hash function into correspondence with one bit. In the example in FIG. 3, such bits in the bit array A that are identified with the bit numbers "0" and "n", each of which has the remainder "0" when being divided by n, are brought into correspondence with the bit identified with the element number "0" in the bit array Y. Further, in the example in FIG. 3, such bits in the bit array A that are identified with the bit numbers "n−1", "2n−1", and "mn−1", each of which has the remainder "n−1" when being divided by n, are brought into correspondence with the bit identified with the element number "n−1" in the bit array Y.

When at least one of the bits having mutually the same remainder is "1", the compressing unit 40 registers "1" into the bit of which the element number is equal to the remainder value in the post-compression bit array. On the contrary, when all of the multiple bits having mutually the same remainder are "0", the compressing unit 40 registers "0" into the bit of which the element number is equal to the remainder value in the post-compression bit array. In the example in FIG. 3, because the bits identified with the bit numbers "2m−1" and "mn−1" in the bit array A are "1", "1" is registered in the bit identified with the element number "m−1" in the bit array X. Further, because the bit identified with the bit number "mn−1" in the bit array A is "1", "1" is registered in the bit identified with the element number "n" in the bit array Y.

A restoration of the bit array A may be performed in the following manner, for example: For each of the bits in the bit array A, the corresponding bits in the bit arrays X and Y are identified. When the corresponding bits are both "1", the bit is restored as "1". On the contrary, when at least one of the corresponding bits is not "1", the bit is restored as "0".

Generally speaking, the words appearing in the sentences included in the compression target file 30 are biased, and the numbers of times of appearance are also biased. For example, many words do not appear. Further, even for appearing words, the number of times of appearance is not so large for many of the appearing words. For these reasons, the bit strings each having four bits and registering therein the numbers of times of appearance are biased in terms of frequency of "0s" and "1s" among the bits.

In the index 34, when the frequency of "0s" and "1s" is biased among the bits, during the compressing process using the plurality of mutually-different hash functions, bit conflicts easily occur in the hash functions. As a result, a lot of noise may occur when the compressed data is restored, in some situations.

Figure 4:
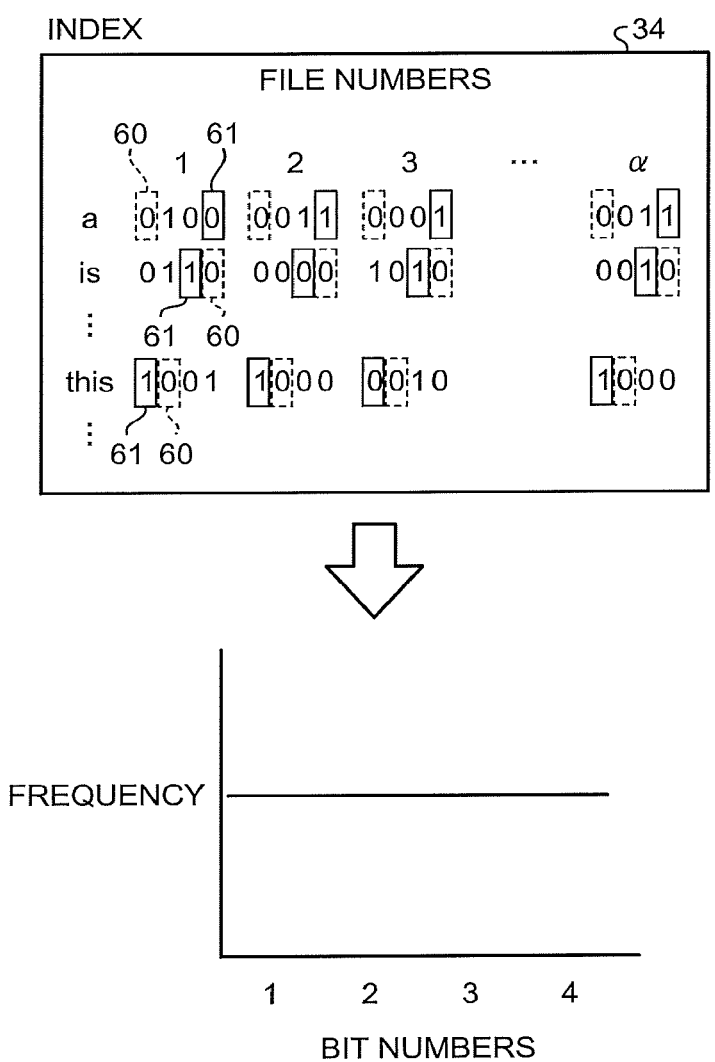
FIG. 4 is a drawing for explaining a process of rearranging bits in the bit strings.

To cope with this situation, in the present embodiment, the bits included in the bit strings provided in the index 34 in correspondence with the words and the files are rearranged within each of the bit strings. FIG. 4 is a drawing for explaining the process of rearranging the bits in the bit strings. FIG. 4 illustrates a result of rearranging the bits in the bit strings in the index 34 illustrated in FIG. 2. In the example in FIG. 4, for the word "is", the bits in the bit strings are rotated by one bit. For the word "this", the bits in the bit strings are rotated by three bits. Further, the example in FIG. 4 illustrates the most significant bits 60 and the least significant bits 61 of the bit strings illustrated in FIG. 2. The lower section of FIG. 4 illustrates an example of frequency with which "1" appears in each of the bits of the bit strings. When the bits have been rearranged within each of the bit strings, the frequency is leveled among the bits.

When the index 34 has been leveled with respect to the frequency of "0s" and "1s" among the bits, bit conflicts are less likely to occur in the hash functions, when the compressing process is performed by using a plurality of mutually-different hash functions. As a result, it is possible to inhibit the occurrence of noise when the data obtained by compressing the index 34 is restored.

A Configuration of the Apparatus

Figure 5:
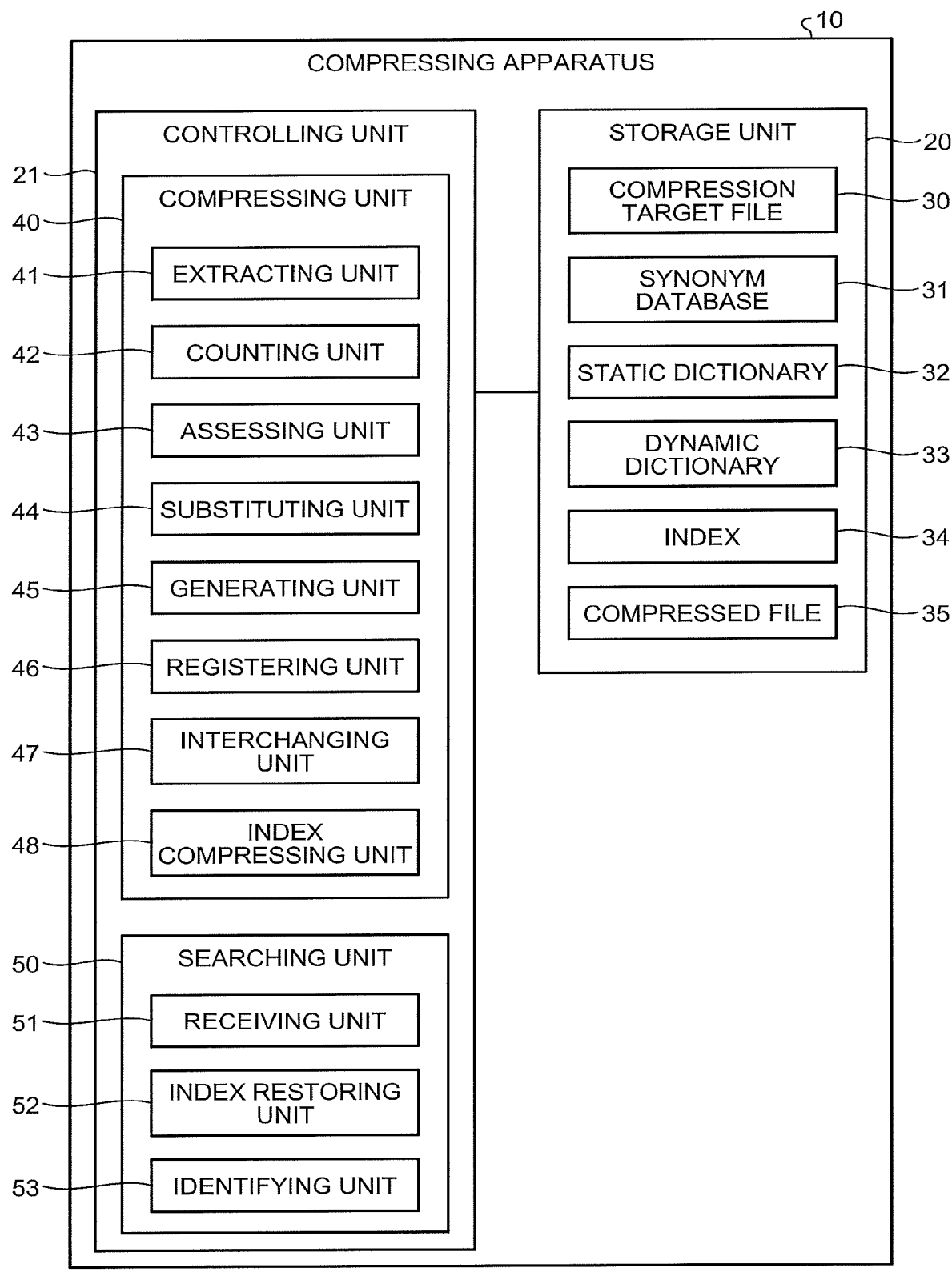
FIG. 5 is a diagram illustrating an exemplary configuration of a compressing apparatus.

Next, a configuration of the compressing apparatus 10 will be explained. FIG. 5 is a diagram illustrating an exemplary configuration of the compressing apparatus. The compressing apparatus 10 is an apparatus configured to perform an encoding process such as the compressing process performed on the compression target file 30. For example, the compressing apparatus 10 is an information processing apparatus such as a computer (e.g., a personal computer or a server computer), a tablet terminal, a smartphone, or the like. The compressing apparatus 10 may be implemented as a single computer or may be implemented as a cloud including a plurality of computers. In the present embodiment, an example will be explained in which the compressing apparatus 10 is implemented as a single computer. As illustrated in FIG. 5, the compressing apparatus 10 includes a storage unit 20 and a controlling unit 21. The compressing apparatus 10 may include devices other than the abovementioned devices included in the computer or the information processing apparatus.

The storage unit 20 is a storage device such as a hard disk, a Solid State Drive (SSD), an optical disk, or the like. Alternatively, the storage unit 20 may be a semiconductor memory in which data is rewritable, such as a Random Access Memory (RAM), a flash memory, a Non-Volatile Static Random Access Memory (NVSRAM), or the like.

The storage unit 20 stores therein an Operating System (OS) and various types of computer programs (hereinafter, "programs") executed by the controlling unit 21. For example, the storage unit 20 stores therein various types of programs used for the compressing process and the searching process described later. Further, the storage unit 20 stores therein various types of data used by the programs executed by the controlling unit 21. For example, the storage unit 20 includes the compression target file 30, a synonym database 31, a static dictionary 32, a dynamic dictionary 33, the index 34, and a compressed file 35.

The compression target file 30 is a file storing therein data of the sentences to be compressed.

The synonym database 31 is data storing therein information about similar words. For example, in the synonym database 31, similar words are registered in units of groups that are each made up words similar to one another.

The synonym database 31 will be explained with reference to FIG. 6. FIG. 6 is a table illustrating an example of a data structure of the synonym database. As illustrated in the example in FIG. 6, the synonym database 31 includes the items "synonym numbers" and "similar words". The item "synonym numbers" corresponds to pieces of identification information each defined for identifying a type of similar words. Stored under the item "synonym numbers" are synonym number codes that are assigned so as not to duplicate the basic codes (explained later). The item "similar words" corresponds to words that are similar to one another. Based on a thesaurus, for example, stored under the item "similar words" are a plurality of words that are similar to one another, for instance. For example, the thesaurus includes approximately 1,600 types of similar words. In the example in FIG. 6, the synonym database 31 has registered therein "mouse", "rat", "cavy", and so on so as to be kept in correspondence with synonym number "F00011h". The letter "h" affixed to the end of each of the synonym numbers, the basic codes, and the compression codes (explained later) is a symbol indicating that the code is expressed in a hexadecimal notation.

Returning to the description of FIG. 5, the static dictionary 32 is data storing therein conversion information that keeps words and the compression codes in correspondence with one another.

Figure 7:
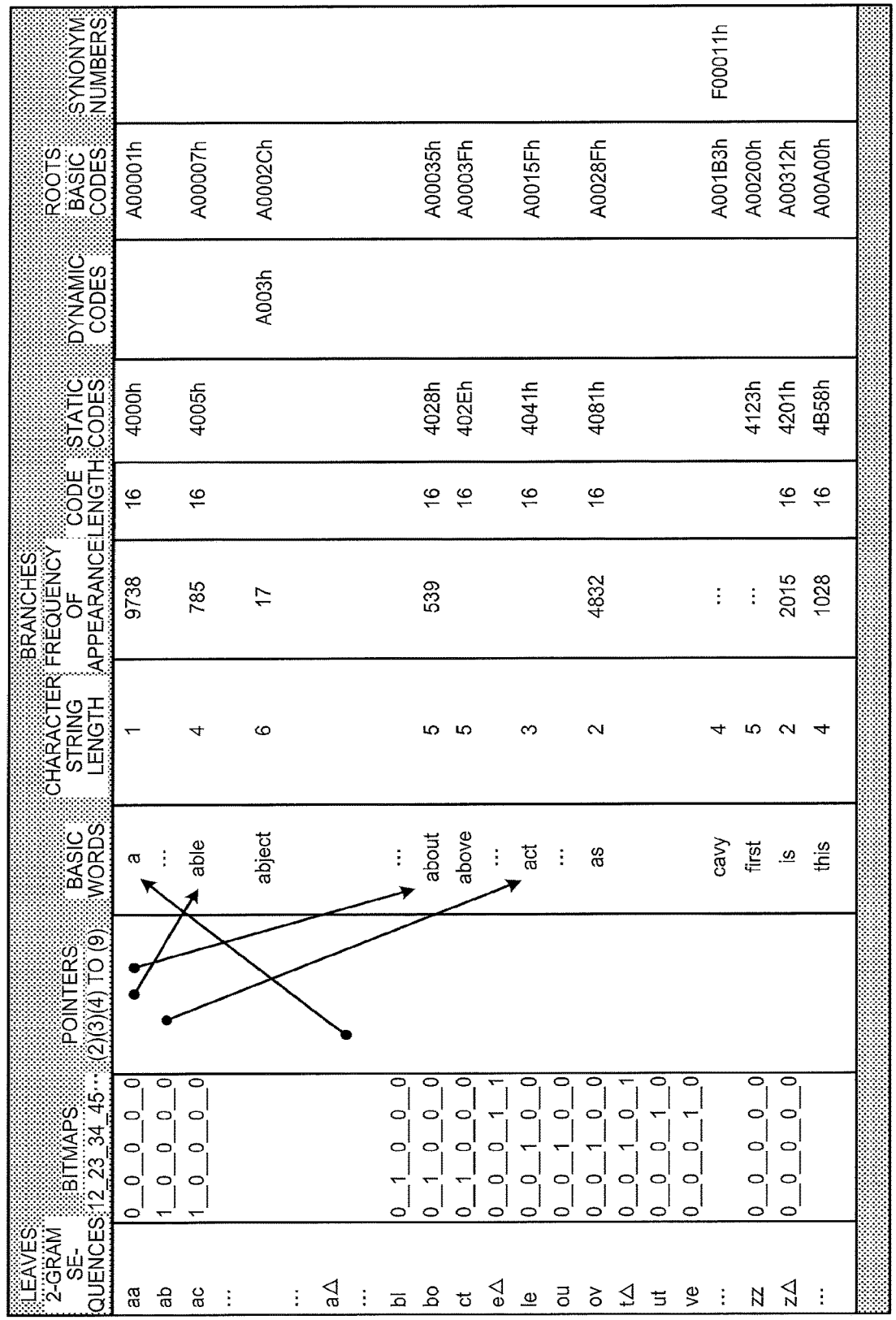
FIG. 7 is a drawing illustrating an example of a static dictionary.

The static dictionary 32 will be explained with reference to FIG. 7. FIG. 7 is a diagram illustrating an example of the static dictionary. As illustrated in the example in FIG. 7, the static dictionary 32 includes items such as "2-gram sequence", "bitmaps", "pointers", "basic words", "character string length", "frequency of appearance", "code length", "static codes", "dynamic codes", "basic codes", and "synonym numbers".

The item "2-gram sequences" is a region for storing therein 2-gram characters included in the words. For example, as illustrated in FIG. 7, the word "able" includes 2-gram characters corresponding to "ab", "bl", and "le". The item "bitmaps" is a region for storing therein bit strings each indicating a position in a basic word where the 2-gram characters is included. For example, when the bitmap of the 2-gram sequence "ab" is "1_0_0_0_0", the bit map indicates that the first two characters of the basic word is "ab". Each of the bitmaps is kept in correspondence with basic words, if any, by pointers. For example, the bitmap "1_0_0_0_0" of the 2-gram sequence "ab" is kept in correspondence with the words "able" and "above".

The item "basic words" is a region for storing therein words that are registered as the basic words in advance. For example, in the static dictionary 32 illustrated in FIG. 7, words extracted from a predetermined population are each registered as a basic word. For example, approximately 190,000 words registered in a dictionary or the like are registered as the basic words. The item "character string length" is a region for storing therein the number of bytes indicating the length of the character string of each of the words registered in advance as the basic words. The item "frequency of appearance" is a region for storing therein the number of times of appearance of each of the words in the predetermined population. The item "code length" is a region for storing therein the number of bits indicating the length of a compression code assigned to each of the words. The item "static codes" is a region for storing therein a compression code assigned in advance to each of the words. The item "dynamic codes" is a region for storing therein the compression code dynamically assigned to each of the words. The item "basic codes" is a region for storing therein a basic code uniquely assigned to each of the basic words. The item "synonym numbers" is a region for storing therein, when the word has one or more similar words, a synonym number indicating the type of similar words to which the word belongs.

In the present embodiment, the basic words registered in the static dictionary 32 are divided into high frequency words of which the frequency of appearance is relatively high and low frequency words of which the frequency of appearance is relatively low. In the present embodiment, the basic words in the top 8,000 ranks for the frequency of appearance are determined as the high frequency words, and the basic words in the 8,001st rank and lower are determined as the low frequency words. To each of the high frequency words, a short compression code is assigned in advance, so that the assigned compression codes are stored in advance under the item "static codes". To each of the low frequency words, a compression code is dynamically assigned upon appearance, so that the assigned compression codes are stored in advance under the item "dynamic codes". In other words, the compression codes are registered in advance for the high frequency words and are unregistered for the low frequency words in the initial state. For example, in the static dictionary 32 illustrated in FIG. 7, for the word "first", because the compression code "4123h" is registered as a static code thereof, it is indicated that the word "first" is a high frequency word. As another example, for the word "cavy", because no compression code has been registered as a static code thereof, it is indicated that the word "cavy" is a low frequency word. Further, because the word "cavy" has similar words, "F00011h" is stored as a synonym number thereof. As yet another example, for the word "abject", because no compression code has been registered as a static code thereof, it is indicated that the word "abject" is a low frequency word. Further, for the word "abject", because the compression code "A003h" has already been registered as a dynamic code thereof, it is indicated that the compression code has already been assigned to the word "abject".

Returning to the description of FIG. 5, the dynamic dictionary 33 stores therein the compression codes dynamically assigned to the basic words. FIG. 8 is a table illustrating an example of a data structure of the dynamic dictionary. As illustrated in the example in FIG. 8, the dynamic dictionary 33 includes the items "basic codes" and "compression codes".

The item "basic codes" is a region for storing therein the basic codes of the words registered in the dynamic dictionary 33. The item "compression codes" is a region for storing therein the compression codes dynamically assigned to the words. In the example in FIG. 8, a basic code "A0002Ch" and a compression code "A003h" of the word "abject" illustrated in FIG. 7 are stored.

Returning to the description of FIG. 5, the index 34 is data storing therein the information about the number of times of appearance of each of the words in each of the files. For example, the index 34 is provided with the bit strings each of which has multiple bits and that are kept in correspondence with the words and the files, so as to store the numbers of times of appearance in the bit strings in correspondence with the words and the files.

Figure 9:
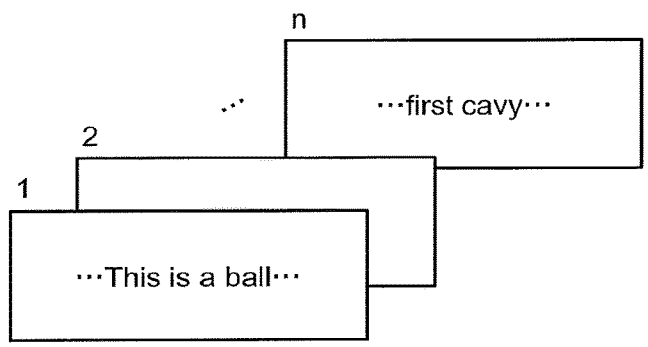
FIG. 9 is a drawing illustrating an example of a data structure of an index.

FIG. 9 is a drawing illustrating an example of a data structure of the index. The index 34 is provided with: a first storage region 34a storing therein the number of times each of the high frequency words appears in each of the files; and a second storage region 34b storing therein the number of times each of the low frequency words appears in each of the files. Further, the index 34 is provided with a third storage region 34c storing therein the number of times similar words related to each of the appearing words appear in each of the files. In the first storage region 34a and the second storage region 34b, bit strings each having four bits and used for storing therein the number of times of appearance are provided in correspondence with the file numbers of the files, for each of the basic codes of the words. Further, in the third storage region 34c, bit strings each having four bits and used for storing therein the number of times of appearance are provided in correspondence with the file numbers of the files, for each of the similar numbers.

The first storage region 34a is provided in advance for the purpose of storing therein whether or not the number of times each of the high frequency words appears in the compression target file 30. In other words, in the first storage region 34a, as many storage regions as the number of high frequency words are reserved in advance. For example, in the example in FIG. 9, the first storage region 34a is provided in advance with records of bit strings for storing therein the number of times of appearance of each of the high frequency words, with respect to the files of which the quantity is equal to α. When a low frequency word appears in the compression target file 30, the second storage region 34b is additionally provided with records of bit strings for storing therein the number of times of appearance of the appearing low frequency word with respect to each of the files. In other words, in the second storage region 34b, every time a new low frequency word appears in the compression target file 30, a storage region is reserved. The third storage region 34c is provided in advance for the purpose of storing therein the number of times of appearance in the compression target file 30, for each of the types of similar words. In other words, in the third storage region 34c, as many storage regions as the number of types of similar words are reserved in advance. The index 34 has recorded therein the number of times of appearance of each of the words appearing in each of the files identified with the file numbers.

Returning to the description of FIG. 5, the compressed file 35 is data obtained by compressing the compression target file 30.

The controlling unit 21 is a device that controls the compressing apparatus 10. As the controlling unit 21, it is possible to use an electronic circuit such as a Central Processing Unit (CPU), a Micro Processing Unit (MPU) or an integrated circuit such as an Application Specific Integrated Circuit (ASIC) or a Field Programmable Gate Array (FPGA). The controlling unit 21 has an internal memory used for storing therein programs defining various types of processing procedures and control data and is configured to execute various types of processes by using the stored programs and control data. As a result of operations of the various types of programs, the controlling unit 21 functions as various types of processing units. For example, the controlling unit 21 includes the compressing unit 40 and a searching unit 50.

The compressing unit 40 extracts the words from the compression target file 30 and generates the compressed file 35 in which the compression codes are kept in correspondence with units of the extracted words. The compressing unit 40 includes an extracting unit 41, a counting unit 42, an assessing unit 43, a substituting unit 44, a generating unit 45, a registering unit 46, an interchanging unit 47, and an index compressing unit 48. In the following sections, constituent elements of the compressing unit 40 will be explained in detail.

The extracting unit 41 extracts character strings in units of words from the compression target file 30. For example, the extracting unit 41 sequentially reads the character strings from the compression target file 30 and extracts words from the read character strings. For example, when words in sentences are separated by predetermined delimiters such as spaces, like in English, the extracting unit 41 reads the character strings from the compression target file 30 and extracts the words from the character strings, by separating the character strings into words according to the delimiters in the character strings. In contrast, when words in sentences are not separated by specific delimiters, like in Japanese for example, the extracting unit 41 reads the character strings from the compression target file 30. After that, the extracting unit 41 extracts the words from the character strings by performing, on the read character strings, a natural language processing process suitable for the language of the sentences, such as a morphological analysis, a syntax analysis, or the like.

The counting unit 42 counts how many times each of the words appears (i.e., the number of times of appearance of each of the words). For example, the counting unit 42 counts the number of times of appearance for each of the words extracted by the extracting unit 41, with respect to each compression target file 30.

The assessing unit 43 makes various types of assessments on the words extracted by the extracting unit 41. For example, the assessing unit 43 assesses whether each of the extracted words is a high frequency word or a low frequency word. For example, the assessing unit 43 compares an extracted word with the static dictionary 32 and obtains the data under the items "static code" and "dynamic code" in the corresponding record. When a compression code is stored under the item "static code", the assessing unit 43 determines that the extracted word is a high frequency word. On the contrary, when no compression code is stored under the item "static code", the assessing unit 43 determines that the extracted word is a low frequency word. When the extracted word is a low frequency word, the assessing unit 43 checks the data under the item "dynamic code". When a compression code is stored under the item "dynamic code", the assessing unit 43 determines that the extracted word is a low frequency word that has already been registered in the dynamic dictionary 33. On the contrary, when no compression code is stored under the item "dynamic code", the assessing unit 43 determines that the extracted word is a low frequency word that has not yet been registered in the dynamic dictionary 33.

The substituting unit 44 substitutes each of the words extracted by the extracting unit 41 with a compression code. For example, when a compression code corresponding to an extracted word is registered in the static dictionary 32, the substituting unit 44 identifies the compression code corresponding to the extracted word. For example, when the extracted word is a high frequency word, the substituting unit 44 identifies the compression code stored under the item "static code" as the compression code corresponding to the word. In another example, when an extracted word is a low frequency word that has already been registered in the dynamic dictionary 33, the substituting unit 44 identifies the compression code stored under the item "dynamic code" as the compression code corresponding to the extracted word. After that, the substituting unit 44 outputs the identified compression code corresponding to the word, to the generating unit 45.

On the contrary, when an extracted word is a low frequency word that has not yet been registered in the dynamic dictionary 33, the substituting unit 44 assigns a new compression code to the extracted word. For example, the substituting unit 44 assigns the new compression code to the extracted word according to a predetermined assignment rule, such as increasing the compression code by one bit at a time in a predetermined range. After that, the substituting unit 44 substitutes the extracted word with the assigned compression code. For example, the substituting unit 44 outputs the compression code assigned in correspondence with the extracted word, to the generating unit 45. Also, the substituting unit 44 stores the basic code of the extracted word and the dynamically-assigned compression code into the dynamic dictionary 33 so as to be kept in correspondence with each other. Further, the substituting unit 44 stores the dynamically-assigned compression code into the static dictionary 32, under the item "dynamic code" corresponding to the extracted word.

The generating unit 45 generates the compressed file 35 obtained by compressing the compression target file 30, by using the compression codes resulting from the substitution performed by the substituting unit 44. For example, the generating unit 45 sequentially stores the compression codes that were read from the compression target file 30 in units of words and were output from the substituting unit 44, into the compressed file 35 sequentially. After that, when the compression codes of all the words have been stored, the generating unit 45 generates the compressed file 35 by storing the dynamic dictionary 33 into the compressed file 35. When the compressed file 35 is to be restored, the low frequency words are restored based on the dynamic dictionary 33 included in the compressed file 35. The high frequency words are restored by finding the words corresponding to the compression codes, by using the static dictionary 32 stored at the destination of the restoration.

The registering unit 46 registers the number of times of appearance of each of the words counted by the counting unit 42, into the index 34. For example, for each of the appearing words, the registering unit 46 registers, into the index 34, a bit string expressing, in multiple bits, the number of times of appearance of the word, so as to be kept in correspondence with the word and the file number of the compression target file 30. Further, when there are similar words including the appearing words, the registering unit 46 registers, into the third storage region 34c, the number of times of appearance so as to be kept in correspondence with the synonym number of the similar words including the word. For example, with respect to an appearing word, when a synonym number is stored under the item "synonym numbers" in the static dictionary 32, the registering unit 46 registers, into the third storage region 34c, the number of times of appearance so as to be kept in correspondence with the synonym number and the file number of the compression target file 30.

Figure 10:
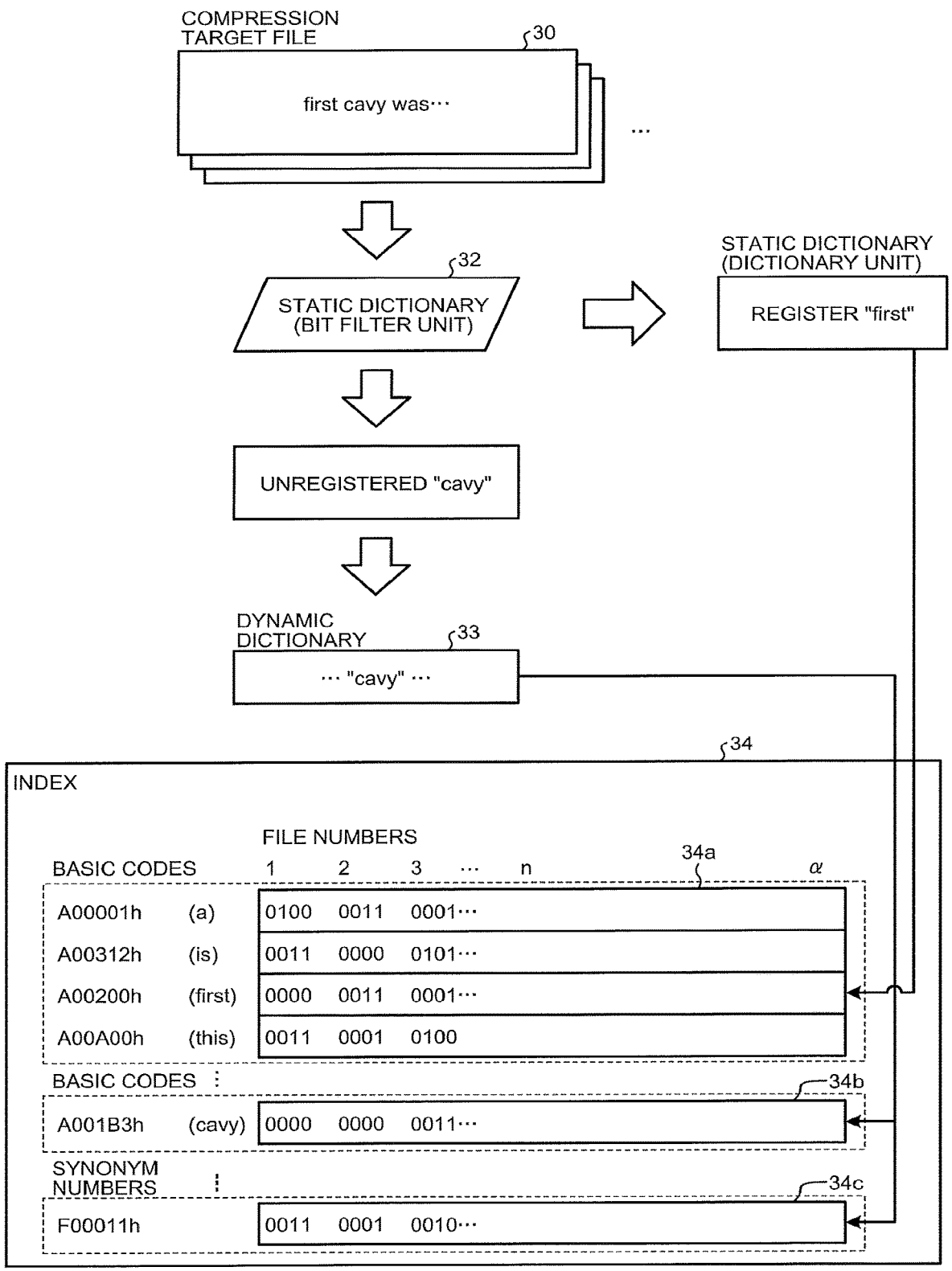
FIG. 10 is a schematic drawing of a flow in a process of registering the numbers of times of appearance into the index.

Next, a flow in the process of registering the numbers of times of appearance into the index 34 will be explained. FIG. 10 is a schematic drawing of the flow in the process of registering the numbers of times of appearance into the index. FIG. 10 illustrates an example in which the numbers of times of appearance of the words included in the sentence "first cavy was . . . " contained in the compression target file 30 are registered. The compressing apparatus 10 extracts the words in units of words from the text included in the compression target file 30. In the example in FIG. 10, "first", "cavy", and "was" are extracted. The compressing apparatus 10 counts the number of times of appearance for each of the words. By comparing each of the obtained words with the static dictionary 32, the compressing apparatus 10 assesses whether each of the words is a high frequency word or a low frequency word. After that, the compressing apparatus 10 registers the number of times of appearance into the index 34 in correspondence with each of the words. For example, when a word is a high frequency word, the compressing apparatus 10 registers the number of times of appearance of the word into the first storage region 34a. When a word is a low frequency word, the compressing apparatus 10 registers the number of times of appearance of the word into the second storage region 34b. Further, when there are similar words containing the word, the compressing apparatus 10 registers, into the third storage region 34c, the number of times of appearance so as to be kept in correspondence with the synonym number of the similar words including the word.

Returning to the description of FIG. 5, the interchanging unit 47 performs various types of interchanging processes. For example, the interchanging unit 47 rearranges the bits in the bit strings by interchanging the bits in the bit strings with one another, for each of the bit strings provided in correspondence with the words and the files in the index 34. For example, the interchanging unit 47 rearranges the bits by rotating the bits in each of the bit strings while using a predetermined number of bits that varies among a plurality of words in the index 34. For example, the interchanging unit 47 sequentially determines the number of rotated bits to be a different one of the values 0, 1, 2, and 3, with respect to each of the words in the index 34 sequentially. After that, for each of the words, the interchanging unit 47 rearranges the bits by rotating the bits, within the bit string by the number of rotated bits.

The index compressing unit 48 compresses the index 34 in which the bits have been rearranged by the interchanging unit 47, while using mutually-different mathematical functions. For example, the index compressing unit 48 converts each of the bit arrays in the index 34 in which bit strings each corresponding to a file and a word are arranged, into two bit arrays, by bringing multiple bits into correspondence with one bit by using mutually-different two hash functions. As a result, the index 34 has been compressed so as to have a smaller data size.

The searching unit 50 searches for a compression target file having a high degree of similarity to a search target character string. The searching unit 50 includes a receiving unit 51, an index restoring unit 52, and an identifying unit 53. In the following sections, constituent elements of the searching unit 50 will be explained in detail.

The receiving unit 51 is a processing unit that receives the search target character string. The receiving unit 51 provides an input interface used for receiving the search target character string so as to receive the search target character string.

The index restoring unit 52 restores the index 34. For example, by referring to the static dictionary 32, the index restoring unit 52 identifies a basic code of each of the words included in the search target character string. Further, the index restoring unit 52 reads the bit arrays X and Y corresponding to the identified basic code, from the index 34. The index restoring unit 52 restores the bit array A by using the bit arrays X and Y. For example, for each of the bits in the bit array A, the index restoring unit 52 identifies the corresponding bits in the bit array X and in the bit array Y. When the corresponding bits are both "1", the index restoring unit 52 restores the bit as "1". When at least one of the corresponding bits is not "1", the index restoring unit 52 restores the bit as "0". The index restoring unit 52 restores the order in which the bits are arranged in the bit strings, by rearranging the bit strings in the restored bit arrays in a manner reversed from that in the compressing process. For example, when the index 34 was rotated by the number of rotated bits that was sequentially determined to be a different one of the values 0, 1, 2, and 3 with respect to each of the words sequentially, the index restoring unit 52 obtains the number of rotated bits based on the order of the words within the index 34. After that, the index restoring unit 52 restores the order of the bits in each of the bit strings, by rotating the bit string in the restored bit array in a reversed manner by the number of rotated bits.

Further, when any of the words included in the search target character string has one or more similar words, the index restoring unit 52 refers to the static dictionary 32 and identifies the synonym number of the word included in the search target character string. The index restoring unit 52 reads the bit arrays X and Y corresponding to the identified synonym number, from the index 34 and restores the bit array A. After that, the index restoring unit 52 restores the order of the bits in each of the bit strings, by rearranging the bit string in the restored bit array in a manner reversed from that in the compressing process.

The identifying unit 53 identifies a file including a character string having a high degree of similarity to the search target character string. The identifying unit 53 identifies a compression target file having a high degree of similarity to the search target character string, based on the numbers of times of appearance of the words included in the search target character string and the numbers of times of appearance of the similar words that are stored in the restored bit arrays in the index 34. For example, for each of the files, the identifying unit 53 calculates a score by performing a weighted calculation on the numbers of times of appearance of the words included in the search target character string and the numbers of times of appearance of the similar words. For example, the identifying unit 53 multiplies the number of times each word is extracted by a larger weight value and multiplies the numbers of times of appearance of each similar word by a smaller weight value and further calculates the score by adding up all the multiplication results. The more times a word has been extracted and the more times a similar word has been extracted, the larger is the value of the score. Based on the score, the identifying unit 53 identifies one or more files including a character string having a high degree of similarity to the search target character string. For example, the identifying unit 53 identifies one or more files of which the score is equal to or higher than a predetermined top ranking places or of which the score is equal to or higher than a predetermined threshold value, as the files having a high degree of similarity. The identifying unit 53 outputs the identified files as a search result. The abovementioned method for calculating the score is merely an example, and possible embodiments are not limited to this example. It is acceptable to use any calculation method as long as it is possible to give a higher score to a file in which the numbers of times of appearance of the words included in the search target character string and the numbers of times of appearance of the similar words are larger.

As explained above, the compressing apparatus 10 rearranges the bit strings in the index 34 within each bit string, the bit strings each expressing the number of times of appearance in multiple bits. The compressing apparatus 10 further compresses the index 34 while using the mutually-different mathematical functions. The compressing apparatus 10 is thus able to compress the index 34 while inhibiting the occurrence of noise at the time of the restoration. Further, the compressing apparatus 10 has the index 34 configured as a count-map type index that has recorded therein, for each of the words, whether the word is included in the files or not. As a result, it is possible to promptly search for a file having a high degree of similarity without having to restore the compressed file to conduct a search therein.

Flows in Processes

Figure 11:
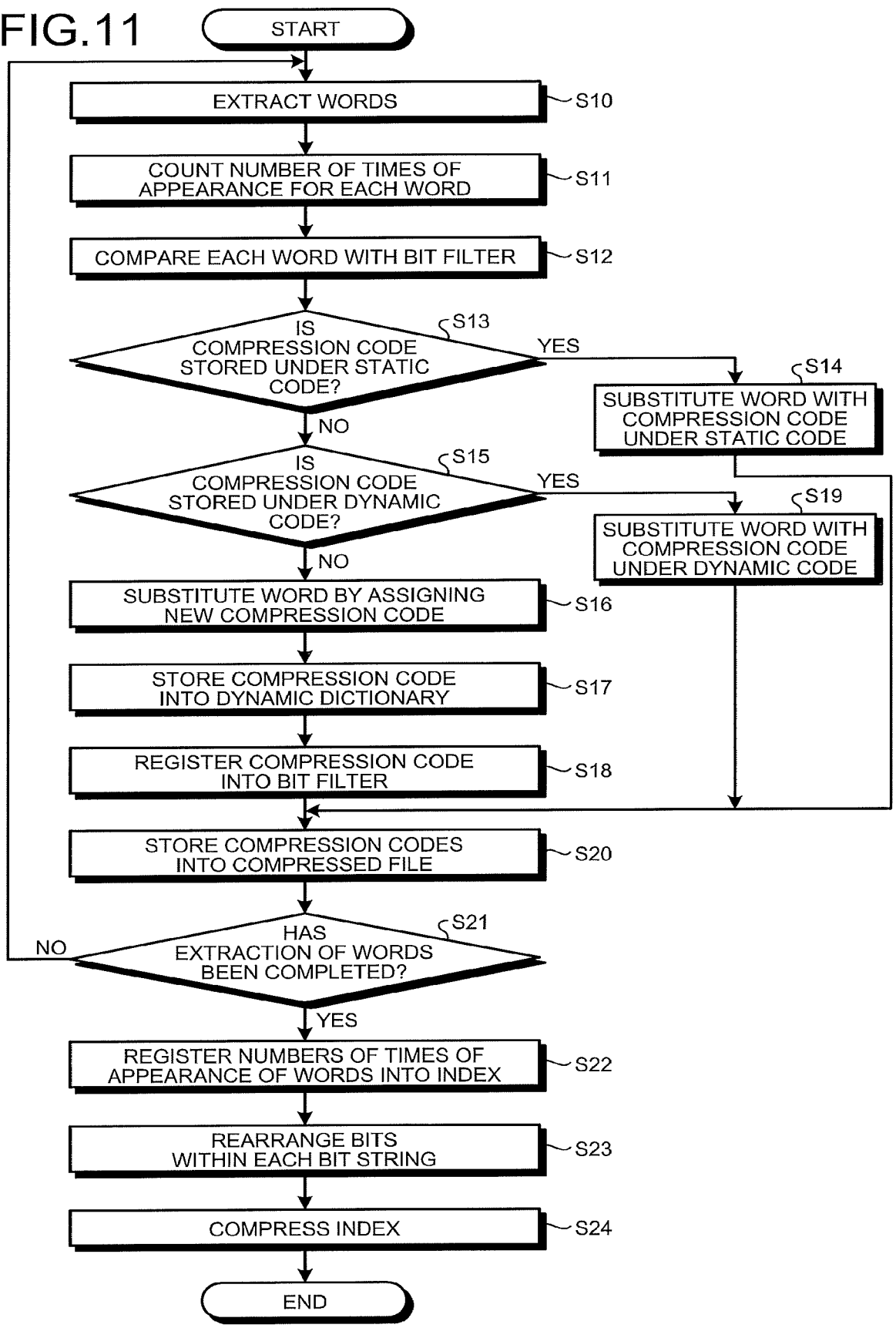
FIG. 11 is a flowchart illustrating an example of a procedure in the compressing process.

Various types of processes performed by the compressing apparatus 10 according to the present embodiment will be explained. First, a flow in a compressing process performed by the compressing apparatus 10 of the present embodiment to encode and compress the compression target file 30 will be explained. FIG. 11 is a flowchart illustrating an example of a procedure in the compressing process. The compressing process is performed with predetermined timing such as, for example, at a time when a predetermined operation is performed to designate the compression target file 30 and to instruct that the compressing process be started.

As illustrated in FIG. 11, the extracting unit 41 sequentially reads character strings from the compression target file 30 and extracts words from the read character strings (step S10). The counting unit 42 counts the number of times of appearance for each of the words (step S11). The assessing unit 43 compares each of the extracted words with the static dictionary 32 and obtains the items "static code" and "dynamic code" (step S12).

The assessing unit 43 assesses whether or not a compression code is stored under the item "static code" (step S13). When a compression code is stored under the item "static code" (step S13: Yes), the substituting unit 44 determines the extracted word to be a high frequency word and substitutes the extracted word with the compression code stored under the item "static code" (step S14).

On the contrary, when no compression code is stored under the item "static code" (step S13: No), the assessing unit 43 assesses whether or not a compression code is stored under the item "dynamic code" (step S15). When no compression code is stored under the item "dynamic code" (step S15: No), the substituting unit 44 determines the extracted word to be a low frequency word that has not yet been registered in the dynamic dictionary 33, dynamically assigns a new compression code thereto, and substitutes the extracted word with the assigned compression code (step S16). Further, the substituting unit 44 stores the basic code of the extracted word and the dynamically-assigned compression code into the dynamic dictionary 33 so as to be kept in correspondence with each other (step S17). Further, the substituting unit 44 stores the dynamically-assigned compression code into the static dictionary 32 under the item "dynamic code" corresponding to the extracted word (step S18).

On the contrary, when a compression code is stored under the item "dynamic code" (step S15: Yes), the substituting unit 44 determines the extracted word to be a low frequency word that has already been registered in the dynamic dictionary 33 and substitutes the extracted word with the compression code stored under the "dynamic code" (step S19).

The generating unit 45 sequentially stores the compression codes resulting from the substitutions into the compressed file 35 (step S20). The extracting unit 41 judges whether or not the extraction of all the words from the text data in the compression target file 30 has been completed (step S21). When the extraction of all the words has not been completed (step S21: No), the process proceeds to step S10 described above.

On the contrary, when the extraction of all the words has been completed (step S21: Yes), the registering unit 46 registers the numbers of times of appearance of the words that were counted, into the index 34 (step S22). For example, for each of the appearing words, the registering unit 46 registers a bit string expressing, in multiple bits, the number of times of appearance of the word, into the index 34 so as to be kept in correspondence with the word and the file number of the compression target file 30.

The interchanging unit 47 rearranges the bits in the bit strings provided in the index 34 in correspondence with the words and the file (step S23). The index compressing unit 48 compresses the index 34 in which the bits have been rearranged, by using mutually-different mathematical functions (step S24), and the process is thus ended.

Advantageous Effects

As explained above, the compressing apparatus 10 according to the present embodiment extracts the words from the compression target file 30. The compressing apparatus 10 counts the number of times of appearance, for each of the extracted words. The compressing apparatus 10 registers the bit strings each expressing the number of times of appearance in multiple bits, into the index 34 so as to be kept in correspondence with the words and the file. The compressing apparatus 10 rearranges the bits included in the bit strings registered in the index 34 within each of the bit strings. The compressing apparatus 10 compresses the index 34 in which the bits have been rearranged, by using the mutually-different mathematical functions. As a result, the compressing apparatus 10 is able to compress the index 34, while inhibiting the occurrence of noise at the time of the restoration.

Further, the compressing apparatus 10 according to the present embodiment rearranges the bits, by rotating the bits in the bit strings, while using the predetermined number of bits that varies among a plurality of words. With this arrangement, the compressing apparatus 10 is able to suppress the bias in frequency between "0s" and "1s" among the bits in the bit strings of the index 34.

[b] Second Embodiment

Exemplary embodiments of the apparatus in the present disclosure have thus been explained. It is, however, possible to carry out the present disclosure in various different modes other than those described in the embodiments above. Accordingly, in the following sections, other embodiments of the present disclosure will be explained.

For example, in the embodiment above, the example is explained in which the interchanging unit 47 sequentially determines the number of rotated bits for each of the words in the index 34 and rotates each of the bit strings by a corresponding number of rotated bits. However, possible embodiments are not limited to this example. For instance, the interchanging unit 47 may sequentially determine the number of rotated bits with respect to the file numbers in the index 34 and rotate each of the bit strings by a corresponding number of rotated bits. For example, the interchanging unit 47 may sequentially determine the number of rotated bits to be a different one of the values 0, 1, 2, and 3 with respect to each of the file numbers in the index 34 sequentially and rotate the bits in each of the bit strings corresponding to a file number by the number of rotated bits, within the bit string. Alternatively, the interchanging unit 47 may determine the number of rotated bits based on each of the words and the file numbers in the index 34 and rotate each of the bit strings corresponding to a word and a file number by the number of rotated bits. Further, the interchanging unit 47 may change the number of rotated bits in correspondence with sets each made up of two or more words or sets each made up of two or more files. Further, the interchanging unit 47 may rearrange the bit strings at predetermined intervals so that, for example, the number of rotated bits is defined once every certain number of words or once every certain number of files. In other words, with respect to the number of rotated bits, the interchanging unit 47 may use any setting rule as long as it is possible to set mutually-different numbers of rotated bits in correspondence with multiple bit strings in the index 34.

Further, in the embodiment above, the example is explained in which the interchanging unit 47 rotates each of the bit strings by the number of rotated bits; however, possible embodiments are not limited to this example. For instance, the interchanging unit 47 may use any rule as long as it is possible to rearrange the bits in each of the bit strings. For example, the interchanging unit 47 may rearrange the four bits in a bit string in the following order: the first bit→the third bit→the second bit→the fourth bit→the first bit. Alternatively, the interchanging unit 47 may rearrange the four bits in a bit string in the following order: the first bit→the fourth bit→the second bit→the third bit→the first bit. Alternatively, the interchanging unit 47 may perform a rearranging process by reversing "0s" and "1s" of a part or all of the bit strings selected according to a predetermined rule. For example, the interchanging unit 47 may select bit strings at predetermined intervals by selecting, for example, a bit string in every certain number of words or a bit string in every certain number of files and may perform a rearranging process by reversing a part or all of the bits in each of the selected bit strings.

In the embodiment above, the example is explained in which, for the high frequency words, the bit arrays are provided in advance in the first storage region 34a of the index 34, whereas for the low frequency words, the bit arrays are provided in the second storage region 34b of the index 34, in the order of appearance; however, possible embodiments are not limited to this example. For instance, the index 34 may be provided in advance with bit arrays corresponding to the basic words.

Figures 12, 13:
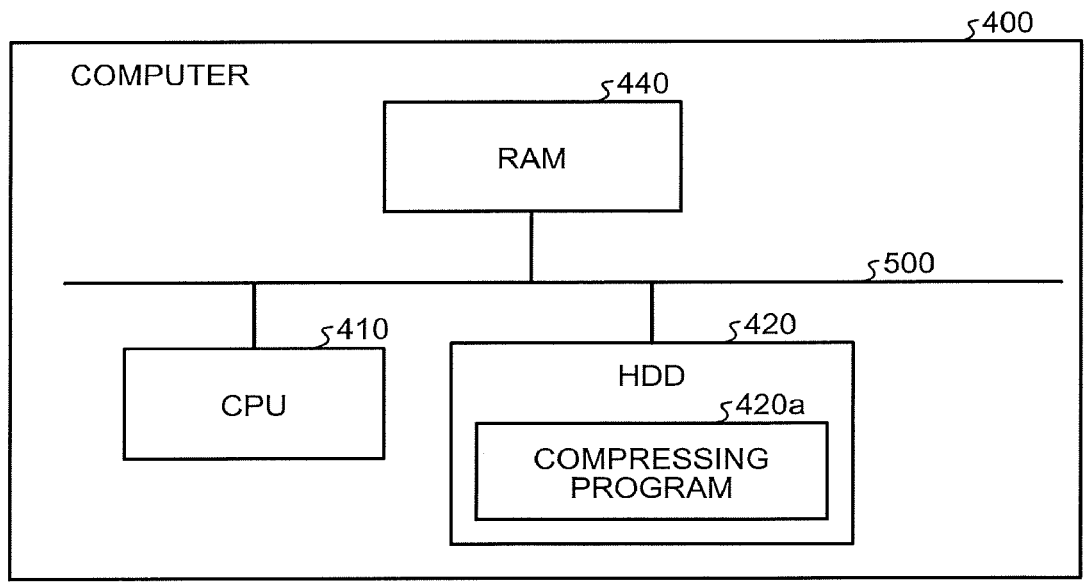
FIG. 12 is drawing illustrating another example of a data structure of the index.
FIG. 13 is a diagram illustrating an example of a computer that executes a compressing computer program.

For example, in the embodiment above, the example is explained in which, for the similar words, the number of times of appearance is stored in the third storage region 34c of the index 34 for in correspondence with each of the similar numbers; however, possible embodiments are not limited to this example. For instance, it is also acceptable to store, for the similar words, the number of times of appearance with respect to each of the words included in the similar words. FIG. 12 is a drawing illustrating another example of a data structure of the index. The index 34 is provided with bit strings each having four bits for storing therein the number of times of appearance, in correspondence with the file numbers of the files, for each of the basic codes of the basic words. In the example in FIG. 12, serial basic codes are assigned to the words included in the set of similar words. In the example in FIG. 12, the serial basic codes are assigned to the similar words "mouse", "rat" and "cavy". When one of the words appears, the number of times of appearance is registered also into the other words that are similar words thereof. In the example in FIG. 12, as a result of the word "cavy" appearing once in the file identified with file number "1", "0001" is registered with "mouse", "rat", and "cavy". In that situation, the similar words will have values that are close to one another as the numbers of times of appearance thereof. To cope with this situation, the interchanging unit 47 rearranges the bits by rotating the bits in each of the bit strings, by using a predetermined number of bits that varies among a plurality of words that are similar to one another. For example, the interchanging unit 47 sequentially determines the number of rotated bits to be a different one of the values 0, 1, 2, and 3 for each of the words in the index 34 sequentially and further rearranges the bits by rotating the bits within the bit string by the number of rotated bits, for each of the words. As a result, even in the situation where the values indicating the numbers of times of appearance of the plurality of words that are similar to one another would be close to one another and where the frequency of "0s" and "1s" would be biased among the bits in the bit strings, it is possible to arrange the frequency of "0s" and "1s" to be leveled among the bits.

The constituent elements of the apparatuses illustrated in the drawings are based on functional concepts. Thus, the constituent elements do not necessarily have to be physically configured as indicated in the drawings. In other words, the specific state of distribution and integration of the apparatuses is not limited to that illustrated in the drawings. It is acceptable to functionally or physically distribute or integrate all or a part of the apparatuses in any arbitrary units, depending on various loads and the status of use. For example, it is acceptable to integrate together, as appropriate, any of the processing units (the extracting unit 41, the counting unit 42, the assessing unit 43, the substituting unit 44, the generating unit 45, the registering unit 46, the interchanging unit 47, and the index compressing unit 48) included in the compressing unit 40 and the processing units (the receiving unit 51, the index restoring unit 52, and the identifying unit 53) included in the searching unit 50. Further, it is also acceptable to separate the processes performed by any of the processing units included in the compressing unit 40 and the searching unit 50, as processes performed by two or more processing units, as appropriate. Furthermore, all or an arbitrary part of the processing functions of any of the processing units may be realized by a CPU and a program analyzed and executed by the CPU or may be realized as hardware using wired logic.

A Compressing Program

Further, it is also possible to realize the various types of processes explained in the embodiments above by causing a program prepared in advance to be executed by a computer system such as a personal computer or a workstation. Accordingly, in the following sections, an example of the computer system that executes the program having the same functions as those described in the embodiments above will be explained. First, a compressing program that performs the compressing process will be explained. FIG. 13 is a diagram illustrating an example of the computer that executes the compressing program.

As illustrated in FIG. 13, a computer 400 includes a Central Processing Unit (CPU) 410, a Hard Disk Drive (HDD) 420, and a Random Access Memory (RAM) 440. These elements 400, 410, 420, and 440 are connected to one another via a bus 500.

The HDD 420 has stored therein, in advance, a compressing program 420a that achieves the same functions as those of the extracting unit 41, the counting unit 42, the assessing unit 43, the substituting unit 44, the generating unit 45, the registering unit 46, the interchanging unit 47, and the index compressing unit 48 described above. The compressing program 420a may be separated, as appropriate.

Further, the HDD 420 stores therein various types of information. For example, the HDD 420 stores therein an Operating System (OS) and various types of data used for the compressing process.

Further, by reading and executing the compressing program 420a from the HDD 420, the CPU 410 executes the same operations as those performed by the processing units described in the embodiments. In other words, the compressing program 420a realizes the same operations as those performed by the extracting unit 41, the counting unit 42, the assessing unit 43, the substituting unit 44, the generating unit 45, the registering unit 46, the interchanging unit 47, and the index compressing unit 48.

The compressing program 420a described above does not necessarily have to be initially stored in the HDD 420.

Further, for example, the compressing program 420a may be stored in a "portable physical medium" such as a flexible disk (FD), a Compact Disk Read-Only Memory (CD-ROM), a Digital Versatile Disk (DVD), a magneto-optical disk, an Integrated Circuit (IC) card, or the like to be inserted into the computer 400. Further, the computer 400 may be configured to read and execute the program from any of these media.

Further, the program may be stored in "another computer (or a server)" connected to the computer 400 via a public circuit, the Internet, a Local Area Network (LAN), a Wide Area Network (WAN), or the like. Further, the computer 400 may be configured to read and execute the program from any of these apparatuses.

According to at least one embodiment of the present disclosure, an advantageous effect is achieved where it is possible to keep the data size of the index small.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a compressing program that causes a computer to execute a process comprising:
   extracting words from a file serving as a processing target;
   counting a number of times of appearance for each word of the extracted words, the number of times of appearance indicating how many times each of the extracted words appears in the file;
   registering a plurality of bit strings into an index, each of the plurality of bit strings indicating the number of times of appearance for each word by multiple bits, on a basis of word in association with the file;
   rearranging bits included in a first bit string and bits included in a second bit string, so as to be in a different order, respectively, the first bit string and the second bit string being included in the plurality of bit strings registered in the index; and
   compressing the index in which the bits have been rearranged, by using mutually different mathematical functions,
   wherein the compressing includes converting each of bit arrays in the index into two bit arrays, by bringing multiple bits into correspondence with one bit by using mutually-different two hash functions, each of the bit arrays in the index indicating a group of one or more bit strings corresponding to a word in association with one or more files.

2. The non-transitory computer-readable recording medium according to claim 1, wherein the rearranging includes rearranging the bits by rotating the bits in each bit string while using a predetermined number of bits that varies among a plurality of words.

3. The non-transitory computer-readable recording medium according to claim 1, wherein
   one or more words that are similar to each of the extracted words is to be registered into the index, and
   the rearranging includes rearranging the bits by rotating the bits in each bit string while using the predetermined number of bits that varies among a plurality of words that are similar to one another.

4. A compressing method comprising:
   extracting words from a file serving as a processing target, by a processor;
   counting a number of times of appearance for each word of the extracted words, the number of times of appearance indicating how many times each of the extracted words appears in the file, by the processor;
   registering a plurality of bit strings into an index, each of the plurality of bit strings indicating the number of times of appearance for each word by multiple bits, on a basis of word in association with the file, by the processor;
   rearranging bits included in a first bit string and bits included in a second bit string, so as to be in a different order, respectively, the first bit string and the second bit string being included in the plurality of bit strings registered in the index, by the processor; and
   compressing the index in which the bits have been rearranged, by using mutually different mathematical functions, by the processor,
   wherein the compressing includes converting each of bit arrays in the index into two bit arrays, by bringing multiple bits into correspondence with one bit by using mutually-different two hash functions, each of the bit arrays in the index indicating a group of one or more bit strings corresponding to a word in association with one or more files.

5. A compressing apparatus comprising:
   a processor configured to:
   extract words from a file serving as a processing target;
   count a number of times of appearance for each word of the extracted words, the number of times of appearance indicating how many times each of the extracted words appears in the file;
   register a plurality of bit strings into an index, each of the plurality of bit strings indicating the number of times of appearance for each word by multiple bits, on a basis of word in association with the file;
   rearrange bits included in a first bit string and bits included in a second bit string, so as to be in a different order, respectively, the first bit string and the second bit string being included in the plurality of bit strings registered in the index; and
   compress the index in which the bits have been rearranged, by using mutually different mathematical functions, wherein, upon compressing, the processor is configured to convert each of bit arrays in the index into two bit arrays, by bringing multiple bits into correspondence with one bit by using mutually-different two hash functions, each of the bit arrays in the index indicating a group of one or more bit strings corresponding to a word in association with one or more files.

* * * * *